US012771628B2

(12) United States Patent
Schulz et al.

(10) Patent No.: US 12,771,628 B2
(45) Date of Patent: Oct. 20, 2026

(54) METHOD FOR AUTOMATED NETWORK TESTING

(71) Applicant: ABB Schweiz AG, Baden (CH)

(72) Inventors: Dirk Schulz, Meckenheim (DE); Pablo Rodriguez, Birkenau (DE)

(73) Assignee: ABB Schweiz AG, Baden (CH)

( * ) Notice: Subject to any disclaimer, the term of this patent is extended or adjusted under 35 U.S.C. 154(b) by 302 days.

(21) Appl. No.: 18/637,943

(22) Filed: Apr. 17, 2024

(65) Prior Publication Data

US 2024/0356829 A1 Oct. 24, 2024

(30) Foreign Application Priority Data

Apr. 21, 2023 (EP) .................................... 23169200

(51) Int. Cl.
*H04L 43/50* (2022.01)
*H04L 41/0631* (2022.01)
*H04L 41/12* (2022.01)

(52) U.S. Cl.
CPC .......... *H04L 43/50* (2013.01); *H04L 41/0631* (2013.01); *H04L 41/12* (2013.01)

(58) Field of Classification Search
CPC ...... H04L 41/12; H04L 41/0631; H04L 43/50
USPC .......................................................... 370/252
See application file for complete search history.

(56) References Cited

U.S. PATENT DOCUMENTS 8,849,993 B2 * 9/2014 Cooper .................. H04L 43/00 709/224
10,951,509 B1 3/2021 Liu et al.
11,405,302 B1 8/2022 Liu et al.
12,218,819 B1 * 2/2025 Georgalis ............ H04L 43/0811
2011/0026425 A1 * 2/2011 Picard .................... G08C 19/16 370/252
2018/0013657 A1 1/2018 Cantwell et al.
(Continued)

OTHER PUBLICATIONS

Schulz, "Intent-Based Automation Networks: Toward a Common Reference Model for the Self-Orchestration of Industrial Intranets," *IECON 2016-42nd Annual Conference of the IEEE Industrial Electronics Society*, 4657-4664 (Oct. 23-26, 2016).
(Continued)

*Primary Examiner* — Peter G Solinsky
(74) *Attorney, Agent, or Firm* — Fitch Even Tabin & Flannery LLP

(57) ABSTRACT

A computer implemented method for creating a test setup for automatically testing a topology and/or configuration of a process automation network includes communicating intents containing a definition of communication connections between communication endpoints and connection specifications between the communication endpoints are received. Topology information of the network to be tested is received and analyzed. Test cases for each of the at least one communication intents are generated by generating a configuration for at least one traffic generator and a configuration for at least one traffic analyzer using the selected communication intents and the topology information. The at least one test case is deployed to test facilities on which test functions are to be run using the traffic generator and traffic analyzer, and the test functions are configured. The process automation network is configured to receive data from traffic generator and provide data to the traffic analyzer.

15 Claims, 3 Drawing Sheets

(56) References Cited

U.S. PATENT DOCUMENTS

| | | | | |
|---|---|---|---|---|
| 2020/0322227 | A1* | 10/2020 | Janakiraman | H04L 61/4541 |
| 2024/0098104 | A1* | 3/2024 | Patronas | H04L 41/16 |
| 2024/0323107 | A1* | 9/2024 | Schornig | H04L 43/087 |
| 2024/0378395 | A1* | 11/2024 | Sommers | G06F 40/40 |

OTHER PUBLICATIONS

European Patent Office, Extended European Search Report in European Patent Application No. 23169200.5, 9 pp. (Oct. 16, 2023).

* cited by examiner

102

STREAM(cyclic) 'Condensate-_S_CondensateSim_S'(QoS data-rate 32 per cycle, timing [0...[177..203] +26ms...250] ;Header:EtherType 2048, ProtocolNumber 17, DstPort 4840, Multicast Dst 239.0.0.2 5E:0:1:0:0:2(0)

from condensate_s.plant.local (192.168.0.3, 0:24:59:0:0:5 cached from endpoints)

to condensatesim_s.plant.local (192.168.0.2, 0:24:59:0:0:4 cached from endpoints)

```
# ## [Ethernet] ###
  dst= 5E:0:1:0:0:2
  src=0:24:59:0:0:5
  type= IPv4
### [IP] ###
     version= 4
     ihl= None
     tos= 0x0
     len= None
     id= 1
     flags=
     frag= 0
     ttl= 64
     proto= udp
     chksum= None
     src= 192.168.0.3
     dst= 239.0.0.2
     \options\
 ### [UDP] ###
       sport =   Randshort
       dport =  4840
       len= None
       chksum= None
### [ Raw] ###
              load='\x84\xd8J\x83\xbfm\x10('
```

Fig. 5A

```
# ## [Ethernet] ###
  dst= 5e:00:01:00:00:02
  src=00:24:59:00:00:05
  type= IPv4
### [IP] ###
     version= 4
     ihl= 5
     tos= 0x0
     len= 36
     id= 1
     flags=
     frag= 0
     ttl= 64
     proto= udp
     chksum= 0xcbla
     src= 192.168.0.3
     dst= 239.0.0.2
     \options\
 ### [UDP] ###
       sport =   382
       dport =  4840
       len= 16
       chksum= 0x792e
### [ Raw] ###
             load=  'u4\xadc\xd6\xfa\xc8\xf8'
```

Fig. 5B

METHOD FOR AUTOMATED NETWORK TESTING

CROSS-REFERENCE TO RELATED APPLICATIONS

The instant application claims priority to European Patent Application No. 23169200.5, filed Apr. 21, 2023, which is incorporated herein in its entirety by reference.

FIELD OF THE DISCLOSURE

The present disclosure relates to a computer implemented method for creating a test setup for automatically testing a topology and/or configuration of a process automation network and a storage medium.

BACKGROUND OF THE INVENTION

Today, industrial networks are tested by running real applications. This requires both the networking hardware and automation devices to be present in the same location, be configured, and able to run. Automation networks are tested implicitly when testing automation functions end to end. This comes with the same effort, constraints, and restrictions as Factory Acceptance Testing (FAT) and Site Acceptance Testing (SAT) in terms of availability of real hardware, but results in low test coverage and insight because success or failure is measured only end to end from application perspective, i.e., working or not working or bad IO status. During FAT and cabinet staging an additional challenge is that not the entire connected (cross-dependent) system is necessarily set up. Prior to hot commissioning, testing is generally done with no process or a process not yet running under final conditions. The same holds when attempting to test a converged network including also IT or telecommunication applications like edge/cloud data collection or voice/video communication, which might not available (full-scale) during staging or on-site commissioning or might simply have dynamic capacity requirements like voice calls.

While the fidelity of this testing approach is very high, so is the effort. It might technically be possible to connect all video cameras, mobile devices, edge clusters and PCs, but it is far from economically feasible. Artificial traffic generation is an option but would today require high manual effort to configure to represent the specific customer project.

BRIEF SUMMARY OF THE INVENTION

There may be a desire to improve the testing of process networks. The described embodiments pertain to a method for creating a test setup for automatically testing a topology and/or configuration of a process automation network and the storage medium. Synergetic effects may arise from different combinations of the embodiments although they might not be described in detail.

The embodiments disclosed herein relate to a method, which may be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

According to a first aspect, a computer implemented method for creating a test setup for automatically testing a topology and/or configuration of a process automation network is provided. The method comprises the following steps. In a first step, communication intents containing a definition of communication connections between communication endpoints and connection specifications between the communication endpoints are received, and at least one communication intent to be tested is selected. In a second step, topology information of the network to be tested is received and analyzed. In a third step, test cases for each of the at least one communication intents are generated by generating a configuration for at least one traffic generator and a configuration for at least one traffic analyzer using the selected communication intents and the topology information. In a fourth step, the at least one test case is deployed to test facilities on which test functions are to be run using the traffic generator and traffic analyzer, and the test functions are configured. In a fifth step, the process automation network is configured to receive data from traffic generator and provide data to the traffic analyzer.

The method allows to automate the specification of tests of a process automation network by using communication intents and to derive the configuration of network traffic generators and analyzers. This is achieved by communication intent based network testing, and by configuring traffic generators and analyzers using the communication intents based on existing network engineering data and topology information. The method may also allow for automating the execution of these tests or the method can be extended to the execution of the tests.

BRIEF DESCRIPTION OF THE SEVERAL VIEWS OF THE DRAWING(S)

FIG. 5A is an exemplary script of generated test traffic in accordance with the disclosure.

FIG. 5B is an exemplary script of a corresponding received traffic in accordance with the disclosure.

DETAILED DESCRIPTION OF THE INVENTION

Figure 1:
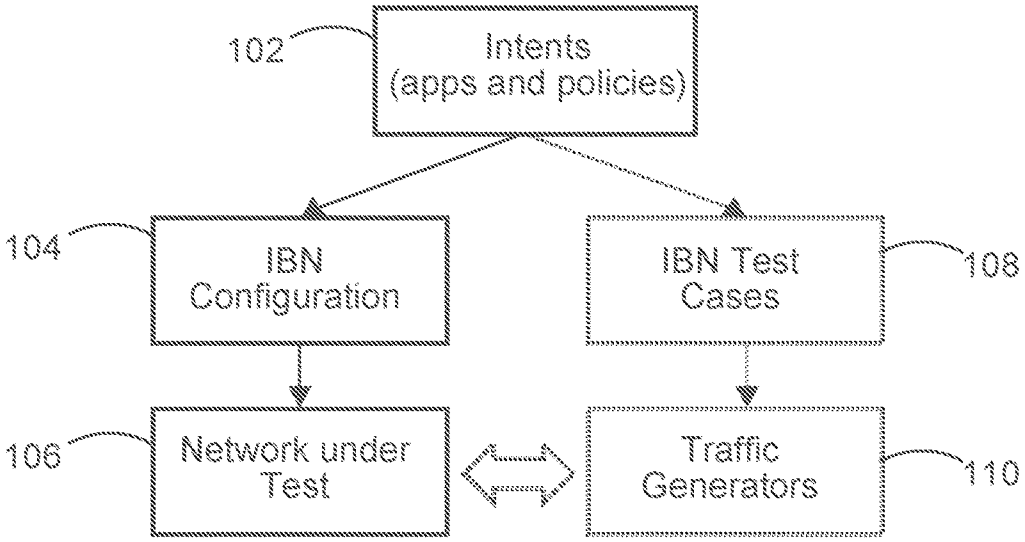
FIG. 1 is a block diagram illustrating an interplay between Intent-Based Networking (IBN) and Intent-Based Network-Testing in accordance with the disclosure.

Corresponding parts are provided with the same reference symbols in all figures. FIG. 1 shows a block diagram illustrating the interplay of Intent-Based Networking (IBN) and Intent-Based Network-Testing. The intents 102 are defined on application level and policies, such as process or communication applications and user defined policies specifying a latency between end-points. From the intents 102 an IBN configuration 104 is derived and applied to a network, which is the network 106 to be tested. That is, the network under test is configured with the IBN configuration. The IBN configuration 104 and the implementation of the network 106 under test are not part this invention. Corresponding to the IBN configuration, the IBN test cases 108 can automatically derived, and from the test cases again the traffic generators 110 and analyzers. The traffic generators generate the data that is induced into the network under test and the analyzers capture data and perform measurements on the network, so that the traffic generators 110 and analyzers interplay with the network under test.

Figure 2:
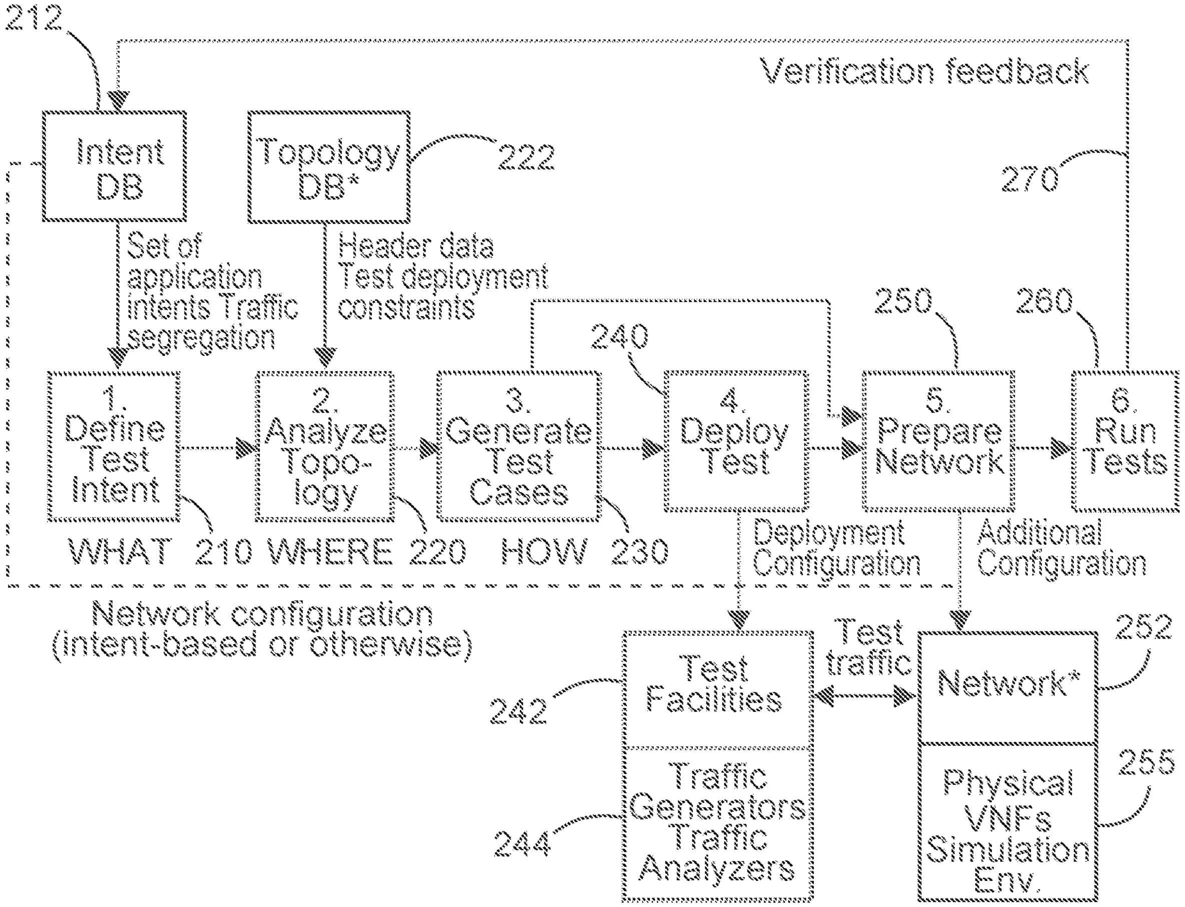
FIG. 2 is a flowchart for a method in accordance with the disclosure.

FIG. 2 shows a flow diagram of the method that may be applied to a network configured to support the needed QoS of one or more automation, IT, or telecommunication applications: Step 210: In a first step, the test context is established by defining the test intent. The test intent is based on communication and application intents 102 stored in a database 212 that are available from the engineering and that are an input to the method. The communication intents define the intended traffic between communication endpoints and also end-to-end communication requirements. A subset is selected from the communication intents. The subset may also include all communication intents. Further, a chosen granularity of traffic segregation may be extracted from engineering or from a configuration. As an example it may be chosen whether only VLANs are used and source MACs do need to be considered. The network under test may be a simulated, emulated or physical network or any combination of these network types.

Step 220: After defining what is to be tested, it is determined where to be tested. That is, the network topology is analyzed and determined. A set of MAC and IP addresses for the endpoints is procured. The addresses are, for example determined MAC or IP addresses of physical devices or temporarily assigned addresses for simulated, emulated or physical devices. A topology database 222 may provide the header data including, for example, source and destination device addresses, and test deployment constraints.

Step 230: With the knowledge of the topology including the MAC and IP addresses for the endpoints test cases are defined. By defining the test cases, also the test fidelity is defined. For example, the test cases comprise a hop-by-hop testing that allows to select the complete set of communication intents, or comprises testing the paths between communication endpoints in accordance with the selected granularity. The test cases may also define whether a part of the network is tested, and if or which communication intents are tested in parallel or subsequently. The definition of a test case further comprises the generation of a configuration for at least one traffic generator and the generation of a configuration for at least one traffic analyzer.

Step 240: The test cases, that is, the test configurations are deployed to the test facilities, e.g., machines that host the network packet generators and analyzers and on which test functions are run, and the test functions are configured. Further the test configuration is input to step 250 to prepare the network 252 in step 250, i.e. configure the physical devices and/or the virtual network functions and the simulation environment 255.

Step 250: In a step 250, the network under test is prepared. The preparation comprises configuring the network 252 as described in the previous step and to connect insertion and extraction points to the test facilities. The connection may be configured in the simulated, emulated or real network using e.g. a remote switch port analyzer to mirror individual remote ports into the machine hosting the network packet generator and/or analyzer.

Step 260: When the deployment of the configuration of the tests cases is finished and the network is prepared, the tests are run, that is, the network packet generators and analyzers, and the test functions are started. Dependent on the definitions in the test cases, the tests may be run sequentially or in parallel.

Step 270: Finally, in a last step, feedback on implementation of original intent is provided to verify the intent implementation. For example, if the related tests have been passed, it is verified that the traffic intended to flow was received and that traffic not intended to work was not received. Further, reachability, timing requirements, QoS requirements such as bandwidth, latency, jitter, fail-over requirements etc. are verified. The feedback is further used to influence the network design. Dependent on the results, the intents, the network configuration, or even the topology may be modified, and a new test may be performed by repeating steps 210 to 270.

Figures 3, 4:
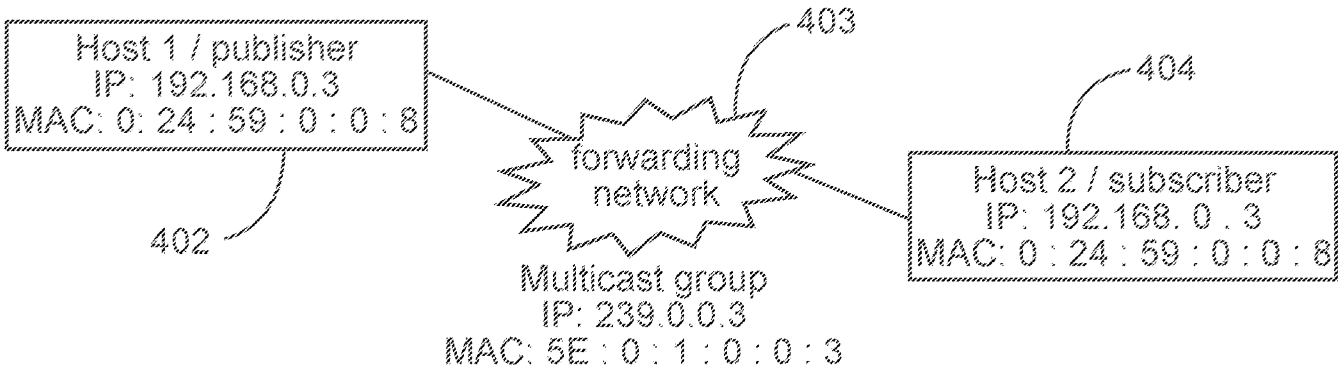
FIG. 3 is an exemplary embodiment for a communication intent in accordance with the disclosure.
FIG. 4 is a block diagram of the communication between hosts in accordance with the disclosure.

FIGS. 3, 4, 5A and 5B show an example of a basic/functional-level network testing. "basic/functional-level" means that performance or latency aspects are not regarded. More specifically, FIG. 3 shows an example of a communication intent 102 as part of a closed-loop control application. It relates to IO signals sent from a control module condensate_S to a process simulation condensate_sim for a water condensation process. The signals are transmitted by OPC UA publish/subscribe, using 239.0.0.2 and 5E: 0:1:0:0:2 as multicast group addresses. The communication intent defines the QoS data-rate and a timing requirement and defines as header information EtherType 2048, which indicates which protocol is encapsulated in the payload of the Ethernet frame, Protocol Number 17 identifying the upper layer protocol that an IP packet should be sent to, the destination port DstPort 4840, and the multicast destination addresses Mulitcast Dst 239.0.0.2 5E: 0:1:0:0:2.

FIG. 4 shows a block diagram of host 1 402 with IP address 192.168.0.3 and MAC address 0:24:59:0:0:8, host 2 404 with IP address 192.168.0.3 and MAC address 0:24:59:0:0:9 that communicate using the multicast group 403 with IP address 239.0.0.3 and MAC address 5E: 0:1:0:0:3, for which the network has previously been configured to forward the multicast traffic to the subscribers/listeners.

FIG. 5A shows an example of generated test traffic and FIG. 5B an example of received traffic of the same connection, where the packets are transmitted in an IPv4 network using UDP. The communication intent shown in FIG. 3 and the topology information shown in FIG. 4 are turned into a configuration for a traffic generator and a traffic analyzer, which is further instructed to add a randomized payload, which forms the test case. FIG. 5B shows one example of a resulting packet that is transmitted on the host 1 402 running a network packet generator function and what is received on the host 2 404 running a network snigger or packet analyzer.

The step selecting at least one communication intent may include selecting one, several, or all communication intents. A test case may cover one or more communication intents. Further, a test case may configure more than one traffic generators and more than one traffic analyzers. Furthermore, the testing may comprise several test cases. The test cases may be run sequentially or in parallel.

In the present disclosure, the expression "testing a network" means that the functionality of the network devices forming the network and the traffic between communication endpoints is tested. In this disclosure, endpoints may be I/O devices, process controllers, servers, HMI devices etc., however also a switch may be an endpoint, e.g., when testing a connection between a switch and a further device. The tests may include verifying timing requirements, data rates and further QoS requirements, fail-over behavior including manipulating the network under test by emulating device or link failures or link degradations on both real and emulated devices, and the correctness of the paths of end-to-end connections between communication endpoints, i.e. the network logic, connectivity, reachability, and unreachability. The communication endpoints and network devices may be configured, for example, with IP addresses, MAC addresses and/or port IDs, and the paths are based on a network topology connecting devices with each other. The term "networking devices" refers to communication endpoints and networking elements such as routing devices such as routers, switches and gateways, which are summarized as "switches".

The communication intents define on an abstract level the intended communication between communication endpoints and the input from and output to the process. They may further define what behavior or state is expected from the network without defining how this should be implemented. Further, they may also specify timing and Quality of Service (QOS) information. A communication intent may imply certain traffic that will be transmitted over the network, as for example, OPC UA publish subscribe between controller and IO, or EAP-TLS communication between a switch and a RADIUS server. Therefore, requirements or specifications for the traffic have to be fulfilled and specified. The intended communication may impact data streams which require a bandwidth or other characteristics that can be taken into account by defining connection requirements or at least connection specifications, including a behavior of the network. A behavior of the network is, for example, a dynamic behavior such as latency to be guaranteed between two endpoints or a static state such as enabling port-based access control on a network segment. A connection may be a one-by-one connection or a connection between one communication endpoint and several communication endpoint, such as a multicast connection.

Communication defined by such communication intents is also referred to as intent-based networking and we refer to network testing or network configuration testing, where testing is also based on communication intentions, as intent-based network testing accordingly in this disclosure. The communication intents are created during an engineering process or may be created automatically by engineering artifacts containing engineering data. The communication intents may also be created during testing, for example, if tested end-to-end connections have to be partitioning to identify a device not capable to support the implementation of the desired intent. An engineering artifact is, for example, an IO list describing the IO allocation of network elements or an IO mapping to control applications. Engineering artifacts are products of an IO engineering that has been performed previous to the testing. That is, the engineering artifacts are already existing information that is readily available and is used as input to the method. In embodiments, the connection requirements or specifications may include user defined rules such as a redundancy policy that specifies, for example, which devices or paths in the network have to be redundant. The user defined rules may be stored, for example, in a volatile memory or as files, which are accessed by the processing device as input for creating communication intents. That is, the tests cover also user defined requirements such as redundancy.

Therefore, intent-based networking may mean to operate a network or parts of the network based on the communication intent. In this disclosure, the communication intent is used for automatic network testing. That is, for automatically configuring test cases using the communication intent as a basic input. Based on the test cases the test facilities and the network can be configured.

A test case relates to a configuration of a test. A test case may define one or more parameters whose values are to be checked. Here, in particular, a test case may include two aspects telling what to test: firstly, the static parts of header data such as communicating endpoints, which have a MAC address or an IP address, protocol-related data such as Ethertype, IP protocol number and TCP/UDP port, or VLAN-IDs. Secondly, the characteristics of the payload and communication pattern such as data-rate, latency, reliability/redundancy requirement, or specific isochronous timing behavior. Regarding the values of the parameters to be verified, the expected value has to be a distinct value, lie within a range, show a behavior over time, etc., depending on the type of parameter. A communication intent may be mapped to one or more test cases. The other way round, a test case may be mapped to one or more communication intents.

The test configuration comprises a configuration for at least one traffic generator and a configuration for at least one traffic analyzer based on the communication intents and the topology information to be used in the testing of the network. The test cases may define further parameters, as for example test duration, output files etc., conditions when the test failed or passed, etc. and, for example post-test actions. Post-test actions may be, for example, repeating a test or starting a further test, modifying a test or network configuration, deploying a successful network configuration, sending notifications to an operator, dumping the test results etc.

The test configuration is the input of test functions that execute the test. The test functions may be implemented or executed at one or at various locations or processors in the network or test facilities. Therefore, the test configuration has to be deployed such that the one or the various processors executing the test functions, traffic analyzers and traffic generators have access to the configurations and the test function can be configured with the test configurations.

The method therefore allows to automate network testing by configuring traffic generators and analyzers using existing network engineering data such as communication intents and topology information.

In embodiments not only the test cases and test functions are configured automatically, but also the network under test, i.e., the network devices to support the communication intents. Thereby, the configuration of the network is derived either from the same input as the test cases, i.e., communication intents and network topology, or from the test cases, which also comprise the communication intent or network topology information. That is, the test cases either comprise already the network configuration or the network configuration is extracted from information available in the test cases, for example, the addresses of the routing elements between the endpoints, timing specifications or QoS requirement such as latency, bandwidth etc. That is, the communication intents and the topology information may be used to define the network configuration.

According to an embodiment, the method further comprises: in a sixth step, for automatically testing the topology and/or configuration of the process automation network, starting the at least one traffic generator and the at least one traffic analyzer and running the test functions; and receiving data from the traffic analyzer and verifying the topology and/or configuration of the process automation network by comparing intended communication with the data from the traffic analyzer.

This step relates to the execution of the test including running the test and obtaining a test result, i.e. receiving a feedback of the implementation of the original intent to verify the intent implementation. The traffic generators may generate traffic, for example by generating random data, with the configured specifications such as frame length, data rates, timing, and therefore simulate the communication endpoints as well as a process, at least in terms of network traffic. Instead of random content in the payload of the data packages, also pre-defined content may be generated, allowing also testing the behavior of the application.

The traffic analyzer is the device, module or function that monitors the traffic. Depending on the implementation, the traffic analyzer evaluates the results, or provides the traffic analysis to a processor, function or module that evaluates the data provided by the traffic analyzer. The processor, function or module that evaluates the data has to know the criteria when a test is passed or failed. Therefore, the traffic analyzer and/or the evaluation processor, function or module have to be configured with at least a part of the configuration of the test case. There may be one or a plurality of traffic generators and one or a plurality of traffic analyzers in the network. The traffic generators and traffic analyzers may be started sequentially or in parallel.

According to an embodiment, the step configuring the process automation network to receive data from traffic generator and provide data to the traffic analyzer further comprises configuring insertion points and extraction points in the network.

The network is configured to connect insertion and extraction points to the test facilities, i.e. either in a network emulation, simulation or in the real network using, a switch with local or remote port mirroring capabilities to mirror individual remote ports into the machine hosting the network packet generator or analyzer. This has the advantage that not only the test cases are auto-generated but also the test execution is fully automated without having to physically connect the at least one traffic generator and analyzer to every port that is receiving or supplying traffic, and multiple tests can be run in parallel, which would not be possible even if you move a network tester around by hand.

According to an embodiment, the configuring insertion points and extraction points in the network comprises configuring local and/or remote insertion or extraction points at a switch port.

For example, a local switch port analyzer may be implemented or configured on a switch. The switch port analyzer may copy the ingress traffic while the switch continues to forward the traffic as normal. Additionally or alternatively, a remote switch port analyzer may be used to centrally monitor traffic from source ports distributed over multiple switches. For configuring remote insertion points and/or extraction points, a VLAN may be defined on all switches that will carry the remote port mirror traffic.

According to an embodiment, the step receiving communication intents and selecting at least one communication intent to be tested further comprises receiving a granularity of traffic segregation in terms of groups of applications or by referring to a combination of potentially masked header data, specifying the traffic segregation and adding the traffic segregation to the connection and test specifications.

The traffic segregation may be achieved by VLANs. For example, a VLAN may be specified for one application, so that networking devices for this application only are tested.

However, since if only VLANs for traffic separation are used, the reception of multicast traffic only from the intended I/O device might be tested, but in fact many devices should receive this multicast traffic, even if they will not do anything with it. This reception of multicast traffic by those devices may be tested by running more traffic analyzers also on ports connecting other devices. As a further aspect, for a low-fidelity test, it might still be enough then to test some of the intents in the VLAN (https) and not all (https, opc ua, ssh) because logical connectivity will not differ.

A chosen granularity of the traffic segregation may be extracted from engineering data or a configuration which may be, for example, defined by an algorithm or a user and input to the method. The granularity defines, for example, the size of the VLAN or the number of switches between the connection endpoints.

The traffic segregation may be defined by header information of a data frame to be transmitted. The traffic segregation, e.g., the VLAN can be defined by the header information of a frame that also contains the MAC or IP addresses of the source and/or destination devices or TCP/UDP ports of the protocols or services which communicate. That is, the traffic segregation may be defined by adding appropriate header information. The networking devices thus know the allowed or forbidden paths and devices to keep the data to be forwarded inside the VLAN.

According to an embodiment, the process automation network is a simulated network, an emulated network, or a real target network of a process automation system, or a combination of these networks. This allows for testing the process network at different development stages.

The expression “real target network of the process” is understood to mean that the actual physical network over which the data of the process in operation will be transmitted. Under the expression emulated network is understood a network different from the target network of the process that, however, behaves in the same way as the target network. In both cases, real devices and virtual devices can be involved. A simulated network simulates the network functions, for example, by software, where several functions may be implemented on the same physical device. More sophisticated, emulation and simulation are considered as two variants of a software-based virtual model of a system, i.e. as online or offline algorithms receiving inputs and delivering outputs: Emulation is the process of mimicking the outwardly observable behavior to match an existing target. The internal state of the emulation mechanism does not have to accurately reflect the internal state of the target which it is emulating. An emulation is, however, intended to be able to substitute the real system that it is emulating including potential restrictions such as e.g. timing behavior, bandwidth, or physical reachability of a remote physical device. For example, a switch could be used as Virtual Network Function (VNF). Depending on implementation, it might behave as deterministically as the real switch—or not. The logical connectivity works also in this case, as well as transparently configuring it.

Simulation imitates the internal working of a system by modeling the underlying mechanisms. It does not have to exhibit an externally observable behavior that allows substituting the real system, but it may serve in this manner to implement an emulation. It should, however, allow predicting or verify if the real system will behave in a specific way. The aspects of substitution and prediction are very important. For example, a PC emulator can run original code on a host to replace the original hardware, but it can do so without simulating electronic circuits. In contrast, a SPICE simulation of a power electronics circuit can impossibly be used instead of the actual circuit, and a flight simulator cannot serve to actually transport people or goods, but each can tell if the circuit would work or if the demonstrated piloting would lead to a safe flight, respectively.

According to an embodiment, the traffic generators and traffic analyzers are real devices or software functions. Not only the networking devices but also the traffic generators and traffic analyzers may be real devices or software functions. The software functions may be implemented on any processing device, for example a computer, and are also referred to as virtual devices.

According to an embodiment, the communication endpoints are identifiable by an MAC address, IP address or port number, and the MAC address, IP address or port number correspond to the real devices or to functions and address assignments are generated temporarily for the purpose of testing.

For testing the network, the addresses do not have to be the actual addresses of physical or virtual devices, but any address. For simulated devices or pure synthetic traffic, temporary MAC or IP addresses may be used, since the real addresses of the final devices are not yet known. If the endpoint is a function, i.e., not a device, then ports might also be needed. The only requirement is that these addresses can uniquely be mapped onto the final actual addresses.

Regarding the traffic, the traffic can be also identified using Ethertype, protocol numbers, etc. which do not relate to a device identification.

According to an embodiment, if a subset of communication endpoints covers an address range, the traffic is analyzed for verifying allowed traffic forwarding between communication endpoints and not allowed traffic forwarding between communication endpoints.

Further, for address ranges specified by, for example, wildcard sources or destinations, a policy may be defined how many endpoint simulations are to be started up, matched with the targeted granularity level of traffic segregation.

According to an embodiment, individual communication intents for the concrete devices in the system are created based on a policy intent using wildcard definitions.

Wildcard definition may be used as a policy intent and create individual intents for the concrete devices that are in the system or that are expected in the system. This means, intents may be defined in a compact manner, i.e. as policy, and still the real communication intents can be created automatically. For example, an intent might state that all devices in an IP network may communication with a device management system and vice versa. On intent-level, this would be good practice even if all concrete devices and IP addresses were known. This could now mean that for every possible IP address, a traffic generator or analyzer is started, which might not be feasible, also depending on network class. Alternatively a suitably chosen subset of addresses could be selected for testing.

According to an embodiment, the automated testing comprises devising tests to probe for forbidden states or behaviors and to analyze whether forbidden states or behaviors are wrongfully supported by the process automation network.

According to an embodiment, the step verifying the topology and/or configuration of the process automation network comprises testing network logic, reachability, network behavior, and/or QoS requirements comprising timing, bandwidth, fail-over requirements, etc.

In other words, the testing can be scaled with respect to the test fidelity. On a basic level, logical network testing is performed, focusing only on static header data. The logical network testing verifies, for example, if a packet sent from a source device arrives at a destination device. Further, source and destination devices can run in open-loop mode, i.e. to test if certain type of traffic arrives, is blocked, or meets certain QoS needs, it is enough to concurrently start two endpoint emulations. The packets themselves do not need to be analyzed, neither to verify if a particular packet that has been sent has arrived. A further step may be to verify the number of packet numbers or amount of traffic.

On an advanced level, the network behavior is tested in that sense that, for example, protocol sequences, an application and/or communication states such as start-up, discovery, authentication, etc. are added.

On a high level, QoS parameters such as bandwidth or data-rate and/or timing behavior are included into the test. This requires high performance and timing-precision on the packet generation and analysis process. Using a mere network emulation might not be sufficient, rather, a high-fidelity network simulation will be required.

According to an embodiment, the method further comprises devising tests to probe for forbidden states or behaviors and to analyze whether forbidden states or behaviors are wrongfully supported by the process automation network. Tests may be performed to check whether the network allows forbidden states or behaviors. These tests ensure that those are not supported by the network.

According to an embodiment, a test case comprises a configuration for testing a network communication between communication endpoints defined by the communication intents or the communication from, to, or between hops, wherein the hops are located between the communication endpoints defined by the communication intents.

In other words, a test defined by a test case may cover the communication between communication endpoints or the communication between and communication endpoint and a hop or between, for example neighboring hops, which may also be referred to as “hop-by-hop”. The test case may be configured such that all intents are covered to obtain a full coverage. Further, the test cases may be organized hierarchically. For example, a low-level test case covers a test between hops, a higher-level test case covers all hop-to-hop tests between communication endpoints of a single communication intent, and a high-level test case covers all communication intents. In this way, a full-scale test can be performed, where the tests may be performed subsequently instead at the same time. Running a full-scale test, i.e., all intents concurrently across the entire network, is not necessarily feasible. At the same time, the proposed approach allows running tests on single network equipment (in a virtual model or using e.g. a remote port mirror). By breaking down test cases for single networking equipment, adapting e.g. latency requirements to one hop instead of many. By later putting the individual tests together again, the same result as for an end-to-end test can be achieved but with full coverage and high fidelity.

A plurality of test cases are run concurrently on the entire process automation network or an intermediate part of the process automation network topology. This allows obtaining a flexible scale test fidelity against coverage by breaking down test cases to run on an intermediate part of the network topology but therefore run more or all test concurrently. When testing real networking hardware, for example in a converged network context, the flexible scaling makes it feasible to stage just individual cabinets and still run all test traffic through it from IT or telecom devices like cameras even though only a controller or IO device might be actually available in the cabinet and even those might not be able to transmit of receive data according to operational patterns for lack of configuration of the attachment of a real process. In other words, this allows general test scalability, but it also allows devising tests specifically cabinet staging where only specific parts of the physical network are accessible. Instead of combining e.g. physical cabinet switches with a virtual backbone ring, a localized cabinet-internal test can be devised with the fidelity of the real networking hardware.

According to an embodiment, the method further comprises the step of auto-assessing test results to identify root-cause of failed tests, wherein the auto-assessing comprises the following step, which may be performed repeatedly until a hop or device causing a test to fail by not implementing the network configuration as required is identified: if an end-to-end test between communication endpoints with a plurality of hops in between fails, performing an end-to-end test between a subset of communication endpoints and/or hops as new communication endpoints.

The tests may be evaluated either on run-time or in a post-processing step. In post-processing, for example, the test is automatically logged, e.g., to a file and the values in the file are compared to expected values. The values may be measurement values such as QoS, packet data such as header data, number of packets, timestamps, etc. A run-time evaluation may, detect the deficiencies immediately. The root-cause may identify, for example, the responsible components or configurations.

When the root-source is identified, the network topology or requirements may be changed to overcome the deficiency and the testing may be re-started.

According to a further aspect, a storage medium comprising a program element that is configured to perform the steps of the method according to any one of the previous claims, when run on a processor.

The storage medium is a computer readable medium such as for example, a USB stick, a CD, a DVD, a data storage device, a hard disk, or any other medium on which a program element as described above can be stored. The program element is a computer program that may be part of a computer program, but it can also be an entire program by itself. For example the computer program element may be used to update an already existing computer program to get to the present invention.

The invention allows a customer to get a choice if they want to pay for the current, time-consuming type of testing or accept synthetic traffic before the automation system goes live on site. Customers will get a faster update cycle for changes by speeding up testing. Furthermore, if combined with an emulated network, configuration changes can be tried with no risk for the real operational network. Customers can expect better test coverage, in particular with regard to cyber-security and zero-trust networking. Overall, the network can be designed, tested, and optimized with much reduced need for HW presence and side-effects on the real system.

These and other features, aspects and advantages of the present invention will become better understood with reference to the accompanying figures and the following description. Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE NUMERALS

102 intents (apps and policies)
104 IBN configuration
106 network under test
108 IBN test cases
110 traffic generators
210 first step of the method/define test intent
212 Intent database (DB)
220 second step of the method
222 Topology database (DB)
230 third step of the method
240 fourth step of the method
242 test facilities
244 traffic generators, traffic analyzers
250 fifth step of the method
252 network
255 physical equipment, virtual network functions (VNF), simulation environment
260 sixth step of the method

270 seventh step of the method
402 Host 1/publisher
403 Multicast group
404 Host 2/subscriber

What is claimed is:

1. A computer implemented method for creating a test setup for automatically testing a topology and/or configuration of a process automation network, comprising:

receiving communication intents containing a definition of communication connections between communication endpoints and connection specifications between the communication endpoints, and selecting at least one communication intent to be tested, wherein each communication intent is defined at an application level to specify intended communication between the communication endpoints including at least one network behavior or performance requirement, without specifying how the process automation network is to implement the intended communication;

receiving and analyzing topology information of the process automation network to be tested;

generating test cases for the selected at least one communication intent by generating a configuration for at least one traffic generator and a configuration for at least one traffic analyzer using the selected at least one communication intent and the topology information, wherein the test cases are configured to test whether communications corresponding to the selected at least one communication intent are forwarded by the process automation network and whether communications not corresponding to the selected at least one communication intent are not forwarded by the process automation network;

deploying the at least one test case to test facilities on which test functions are to be run using the at least one traffic generator and the at least one traffic analyzer, and configuring the test functions; and configuring the process automation network to receive data from the at least one traffic generator and provide data to the at least one traffic analyzer.

2. The method according to claim 1, wherein the method further comprises:

for automatically testing the topology and/or configuration of the process automation network, starting the at least one traffic generator and the at least one traffic analyzer and running the test functions; and receiving data from the traffic analyzer and verifying the topology and/or configuration of the process automation network by comparing intended communication with the data from the traffic analyzer.

3. The method according to claim 1, wherein the step configuring the process automation network to receive data from traffic generator and provide data to the traffic analyzer further comprises configuring insertion points and extraction points in the network.

4. The method according to claim 3, wherein the configuring insertion points and extraction points in the network comprises configuring local and/or remote insertion or extraction points at a switch port.

5. The method according to claim 1, wherein the step receiving communication intents and selecting at least one communication intent to be tested further comprises receiving a granularity of traffic segregation in terms of groups of applications or by referring to a combination of potentially masked header data, specifying the traffic segregation and adding the traffic segregation to the connection and test specifications.

6. The method according to claim 1, wherein the process automation network is a simulated network, an emulated network, or a real target network of a process automation system, or a combination of these networks.

7. The method according to claim 1, wherein the traffic generators and traffic analyzers are real devices or software functions.

8. The method according to claim 1, wherein the communication endpoints are identifiable by an MAC address, IP address or port number, and wherein the MAC address, IP address or port number correspond to the real devices or to functions and address assignments are generated temporarily for the purpose of testing.

9. The method according to claim 1, wherein, when a subset of communication endpoints covers an address range, the traffic is analyzed for verifying allowed traffic forwarding between communication endpoints and not allowed traffic forwarding between communication endpoints.

10. The method according to claim 1, wherein individual communication intents for the concrete devices in the system are created based on a policy intent using wildcard definitions.

11. The method according to claim 1, wherein the method further comprises devising tests to probe for forbidden states or behaviors and to analyze whether forbidden states or behaviors are wrongfully supported by the process automation network.

12. The method according to claim 2, wherein verifying the topology and/or configuration of the process automation network comprises testing network logic, reachability, network behavior, and/or QoS requirements comprising timing, bandwidth, and fail-over requirements.

13. The method according to claim 1, wherein a test case comprises a configuration for testing a network communication between communication endpoints defined by the communication intents or the communication from, to, or between hops, wherein the hops are located between the communication endpoints defined by the communication intents.

14. The method according to claim 1, wherein the method further comprises the step of auto-assessing test results to identify root-cause of failed tests.

15. The method according to claim 14, wherein the auto-assessing comprises repeatedly, when an end-to-end test between communication endpoints with a plurality of hops in between fails, performing an end-to-end test between a subset of communication endpoints and/or hops as new communication endpoints until a hop or device causing a test to fail by not implementing the network configuration as required is identified.

* * * * *